United States Patent [19]
Day

[11] 3,871,748
[45] Mar. 18, 1975

[54] ANAMORPHOTIC OPTICAL OBJECTIVE

[75] Inventor: David John Day, Cheltenham, England

[73] Assignee: The Rank Organisation Limited, Millbanks, London, England

[22] Filed: Mar. 29, 1973

[21] Appl. No.: 346,188

[30] Foreign Application Priority Data
Mar. 29, 1972 United Kingdom .............. 14814/72

[52] U.S. Cl. ................................. 350/181, 350/190
[51] Int. Cl. ........................................... G02b 13/08
[58] Field of Search ............................ 350/181, 190

[56] References Cited
UNITED STATES PATENTS
| | | | |
|---|---|---|---|
| 2,890,622 | 6/1959 | Wallin | 350/190 |
| 3,428,398 | 2/1969 | Gottschalk | 350/181 |
| 3,517,984 | 6/1970 | Lindstedt et al. | 350/181 |
| 3,644,037 | 2/1972 | Larraburu | 350/181 |

*Primary Examiner*—Ronald L. Wibert
*Assistant Examiner*—Conrad Clark
*Attorney, Agent, or Firm*—Brisebois & Kruger

[57] ABSTRACT

An anamorphotic optical system comprising a spherical lens unit and two cylindrical lens units, one in front of the spherical lens unit and one behind it, the two cylindrical lens units being individually parfocal between their cylindrically active and cylindrically passive planes with respect to the object plane and the focal plane of the spherical lens unit.

6 Claims, 1 Drawing Figure

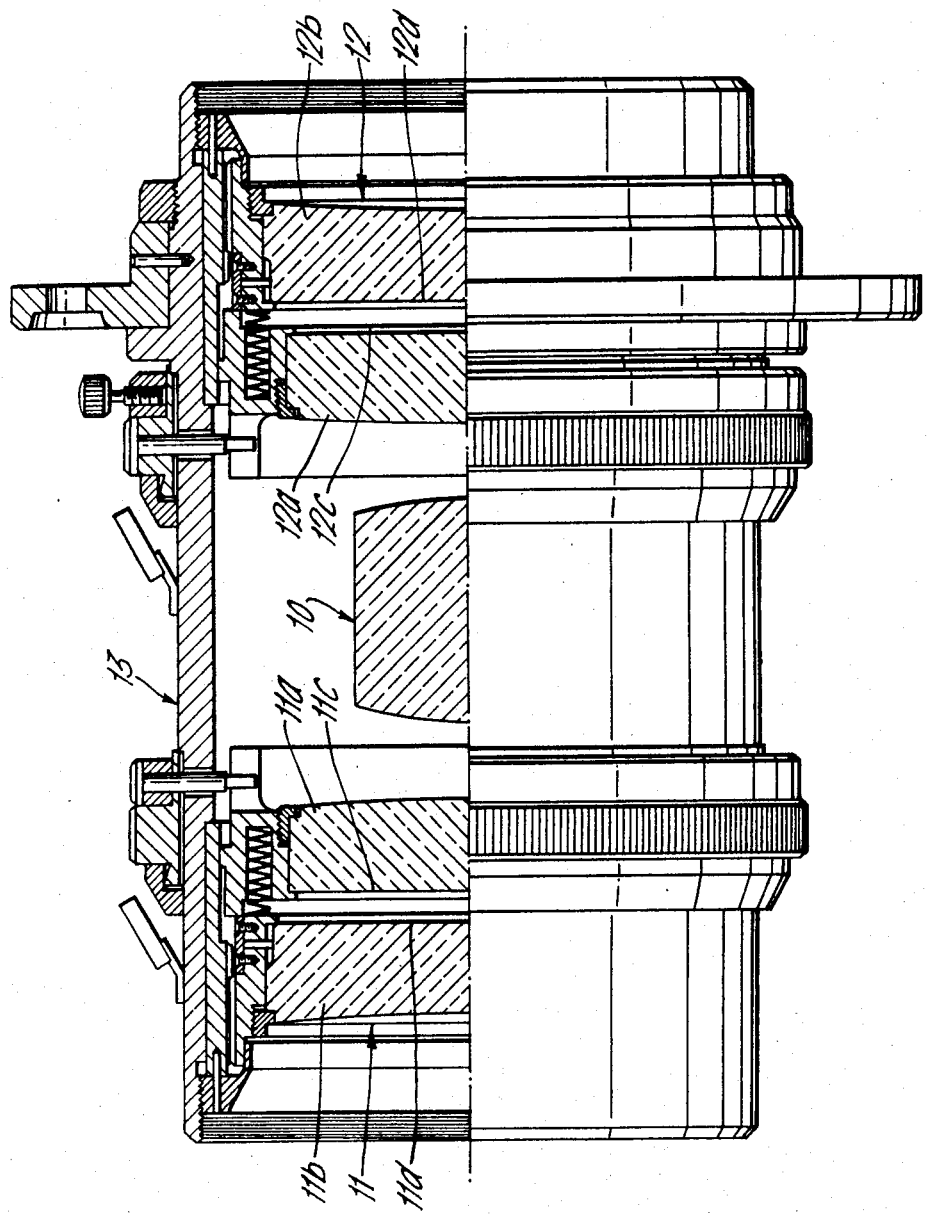

ANAMORPHOTIC OPTICAL OBJECTIVE

BACKGROUND OF THE INVENTION

This invention relates to an anamorphotic optical objective system, more especially for a process camera of the kind commonly employed in the printing industry, wherein the initial stage of a printing process is carried out using a so-called process lens.

In such a printing or allied process, a requirement often arises whereby, to compensate for distortion in subsequent stages, it is desirable to produce a photograph which is of the usual very high standard of resolution necessary for the graphic arts industry, but wherein the magnification of the image differs in one direction transverse to the optical axis from that in the direction transverse to the optical axis which is normal to the first direction.

The object of the invention is to provide an improved anamorphotic optical objective system which is of simple construction and high optical performance.

BRIEF SUMMARY OF THE INVENTION

The anamorphotic optical objective system according to the invention comprises a spherical lens unit and two cylindrical lens units, one in front of the spherical lens unit and one behind it, the two cylindrical lens units being individually parfocal between their cylindrically active and cylindrically passive planes with respect to the object plane and image plane of the spherical lens unit. The individual parfocal property of the cylindrical lens units means that the images formed of the object and image planes, by the respective cylindrically surfaced lens units are free of axial astigmatism and thus may be imaged onto one another successfully by any corrected, spherically surfaced lens unit.

It is to be understood that, with this system, the object and image planes are interchangeable.

The parfocal property of each cylindrical lens unit can be mathematically expressed as follows, assuming that each such unit can be represented by two single thin lenses, i.e., thin lenses equivalent to the practical lenses 11a and 11b (or 12a and 12b) in the accompanying drawings so that thin lens formulae apply:

$$F_2 = [-m \, x \, (L - x)/L \, (1 - m)]$$

$$F_1 = [L \, (x - F_2)/(L - x + F_2) \, (1 - m)]$$

where $L$ is the distance from the front thin lens to the focal plane behind the rear thin lens; $x$ is the distance between the front and rear thin lenses; $F_1$ and $F_2$ are respectively the equivalent focal lengths in the cylindrically active planes of the front and rear thin lenses, respectively, and $m$ is the magnification in the cylindrically active plane of the complete cylindrical lens unit.

For use in a process camera, the spherical lens unit may conveniently comprise a conventional spherically surfaced process lens. The use of any such conventional process lens is made possible by the parfocal property of each cylindrical lens unit.

FURTHER FEATURES OF THE INVENTION

In practice, certain aberrations arise due to the presence of the cylindrical lens units, in both the cylindrically active and the cylindrically passive planes. A compromise has to be effected to minimise and balance these aberrations, having regard to the values of $L$, $x$ and $P$, where $P$ is the distance from the appropriate pupil of the spherical lens unit to the front cylindrical lens. Preferably, the axial thicknesses of the lens components of each cylindrical lens unit, together with the refractive indices and Abbe V numbers of the materials of these components, are chosen to assist in minimising and balancing aberrations in the cylindrically active and cylindrically passive planes of the unit. In addition, the spherical lens unit may be designed with sufficient departures from flat field correction to assist in compensating for residual aberrations arising in the cylindrical lens units.

Each cylindrical lens unit preferably comprises a pair of cylindrical lenses, one convergent and one divergent. Each such lens of each pair preferably has one cylindrical surface and one plane surface. However, if desired, the cylindrical power of each unit may be divided between the four surfaces of the respective lens pairs, which affords choice in the selection of surface powers to assist in aberration correction.

In a preferred embodiment, the anamorphotic effect of the system is continuously variable by rotating one cylindrical lens unit in one sense and simultaneously and equally rotating the other cylindrical lens unit in the opposite sense. In one arrangement, the anamorphotic effect is variable between zero and about 8%. For zero effect, the two cylindrical lens units are angularly positioned with their cylindrically active planes coplanar, for example at 45° to the vertical. The anamorphotic effect is increased up to a maximum as the front cylindrical unit is rotated in one sense, so that its cylindrically active plane turns towards the horizontal, while the rear cylindrical unit is rotated in the opposite sense, so that its cylindrically active plane turns towards the vertical. The maximum effect is obtained when the cylindrically active planes of the respective units are perpendicular.

In this case, the law of increase in anamorphing approximately follows the equation:

$$\alpha = 2 \sqrt{2} \, A \cos (\beta = 45°),$$

where $\alpha$ is the percentage increase in anamorphing for rotation by an angle $\beta$ of each unit from the zero effect position, and $A$ is the maximum percentage effect (about 8%) achievable when $\beta$ reaches 45°.

If it is desired to maintain unchanged magnification (usually unit magnification) in one plane (the vertical plane in the example mentioned above), when the anamorphotic effect is altered, then it is necessary to adjust the relative axial positions of the object plane, the optical system and the focal plane.

In addition it is desirable, when the anamorphotic effect is varied, to maintain equality of focus between the cylindrically active and the cylindrically passive planes, thereby to avoid astigmatism. Preferably, therefore, simultaneously with rotation of the respective cylindrical lens units, one lens of each unit is moved axially relative to the other lens of the unit to maintain equality of focus as between the cylindrically active and the cylindrically passive planes.

DESCRIPTION OF EMBODIMENTS

A preferred practical embodiment of anamorphotic optical objective system according to the invention will now be described by way of example with reference to the accompanying drawing, which shows the preferred system in half section through the optical axis.

This system comprises a conventional spherically surfaced process lens 10 having a cylindrical lens unit 11 consisting of a pair of cylindrical lenses, one (11a) convergent and one (11b) divergent, in front of it (on the object side) and a cylindrical lens unit 12 consisting of a pair of cylindrical lenses, one (12a) convergent and one (12b) divergent, behind it (on the image side). The system is housed in a mount 13 to be fitted in a process camera (not shown) and is therefore intended to operate at approximately unit magnification. Each cylindrical lens has one plane surface, respectively designated 11c, 11d and 12c, 12d.

Each unit pair of cylindrical lenses is supported in mount 13 for rotation, one unit 11 rotating equally and simultaneously with the other unit 12 but in the opposite rotational sense, and within each unit one lens 11a or 12a is axially movable relative to the other 11b or 12b in association with rotation of the unit.

In a position in which the anamorphotic effect is zero, the two cylindrical lens units 11, 12 have their cylindrically active planes coplanar. When oppositely sensed rotations of the two units 11, 12 are effected, an increasing anamorphotic effect is introduced, up to a maximum of about 8% when the cylindrically active planes are perpendicular. The simultaneous axial movement of one lens 11a or 12a relative to the other 11b or 12b within each unit maintains equality of focus between the cylindrically active and cylindrically passive planes. In a process camera, the mount 13 of the system may be supported for movement along the optical axis to enable the relative positions of the object plane and image plane to be adjusted to maintain unchanged unit magnification in a particular plane.

An essential feature of the arrangement is that, for a given anamorphotic effect fixing the object and image planes, the cylindrical lens units 11 and 12 are individually parfocal between their cylindrically active and passive planes with respect to the object and focal planes, respectively, of the spherical unit 10.

In one practical embodiment applicable to a symmetrical process lens consituting the spherical lens unit, the two cylindrical lens units are constructionally similar, the front to rear surfaces of the front unit corresponding to the rear to front surfaces of the rear unit. In this embodiment, the front unit has a front lens with a front surface concave to the front of radius 452.55 and a rear planar surface, and a rear lens with a front planar surface and a rear surface convex to the rear of radius 501.76. The axial thicknesses of the front and rear lens (rear and front lenses of the rear unit) are, respectively, 20.42 and 20.42. The axial spacing between the two lenses of each unit is 6.52 at zero anamorphotic effect. This spacing is reduced at maximum anamorphotic effect to 4.28 in the front unit and 3.54 in the rear unit. The lenses are made of the same material, mean refractive index 1.58 and Abbé V number 53.7.

The lens mount 13 shown in the drawing is provided with two rings for individual rotation of the two cylindrical lens units by hand. The mount incorporates a conventional mechanism for producing the required variation in the separation of the lenses of the front and rear cylindrical lens units automatically when the respective rings are rotated.

Various modifications of the above described arrangement are possible within the scope of the invention, and in particular the invention is not limited to arrangements providing a variable anamorphotic effect.

I claim:

1. An anamorphotic objective system comprising a spherical lens unit and two cylindrical lens groups constituted by one cylindrical lens group in front of the spherical lens unit and one cylindrical lens group to the rear of the spherical lens unit, wherein each cylindrical lens group comprises a pair of cylindrical lenses, one convergent and one divergent, and the cylindrical lens groups are individually parfocal between their cylindrically active and cylindrically passive planes with respect to the object plane and the focal plane of the spherical lens unit, the cylindrical lenses in each group being relatively movable in the axial direction to maintain equality of focus between the cylindrically active and cylindrically passive planes during variation of the anamorphotic effect.

2. A system according to claim 1, wherein each cylindrical lens has one cylindrical surface and one planar surface.

3. A system according to claim 1, wherein the axial thicknesses of the cylindrical lens of each unit, in conjunction with the mean refractive indices and Abbé V numbers of these lenses, are chosen to minimize aberrations arising in the cylindrical lens groups, while the spherical lens unit is designed with a departure from flat field correction to compensate for aberration residuals of the cylindrical lens groups.

4. An anamorphotic objective system comprising a spherical lens unit and two cylindrical lens groups constituted by one cylindrical lens group in front of the spherical lens unit and one cylindrical lens group to the rear of the spherical lens unit, said cylindrical lens group being relatively rotatable to vary the anamorphotic effect, wherein the cylindrical lens groups are individually parfocal between their cylindrically active and cylindrically passive planes with respect to the object plane and the focal plane of the spherical lens unit, the cylindrical lenses in each group being relatively movable in the axial direction to maintain equality of focus between the cylindrically active and cylindrically passive planes during variation of the anamorphotic effect.

5. A system according to claim 4, wherein the anamorphotic effect is continuously variable by equal rotations of the cylindrical groups in opposite senses about the optical axis of the spherical lens unit.

6. A system according to claim 5, wherein the axial position of the complete system is variable relative to the object plane in order to maintain unchanged magnification in the cylindrically passive plane during variation of the anamorphotic effect.

* * * * *